US 12,557,473 B2

(12) United States Patent
Wang et al.

(10) Patent No.: US 12,557,473 B2
(45) Date of Patent: Feb. 17, 2026

(54) DISPLAY PANEL, DISPLAY DEVICE AND DISPLAY APPARATUS

(71) Applicant: BOE Technology Group Co., Ltd., Beijing (CN)

(72) Inventors: Can Wang, Beijing (CN); Yan Qu, Beijing (CN); Qiuyu Ling, Beijing (CN)

(73) Assignee: BOE Technology Group Co., Ltd., Beijing (CN)

( * ) Notice: Subject to any disclaimer, the term of this patent is extended or adjusted under 35 U.S.C. 154(b) by 558 days.

(21) Appl. No.: 17/795,298

(22) PCT Filed: Aug. 5, 2021

(86) PCT No.: PCT/CN2021/110858
§ 371 (c)(1),
(2) Date: Jul. 26, 2022

(87) PCT Pub. No.: WO2022/052689
PCT Pub. Date: Mar. 17, 2022

(65) Prior Publication Data
US 2023/0106056 A1     Apr. 6, 2023

(30) Foreign Application Priority Data
Sep. 14, 2020   (CN) .......................... 202010962609.2

(51) Int. Cl.
*H10K 59/38*       (2023.01)
*F21V 8/00*        (2006.01)
(Continued)

(52) U.S. Cl.
CPC ......... *H10K 50/858* (2023.02); *G02B 6/0016* (2013.01); *G02B 6/0038* (2013.01);
(Continued)

(58) Field of Classification Search
CPC ........... G02B 6/00; H10K 59/38; H10K 50/00
(Continued)

(56) References Cited

U.S. PATENT DOCUMENTS 6,075,596 A *   6/2000   Pan ......................... G02F 1/093
                                                        356/450
6,219,113 B1 *  4/2001   Takahara .......... G02F 1/133526
                                                         345/98
(Continued)

FOREIGN PATENT DOCUMENTS

CN        104678641 A        6/2015
CN        105388623 A        3/2016
(Continued)

OTHER PUBLICATIONS

JP Reference.*
(Continued)

*Primary Examiner* — Kaveh C Kianni
(74) *Attorney, Agent, or Firm* — IPro, PLLC (57) ABSTRACT

Provided is a display panel. The display panel includes: a base substrate; a plurality of sub-pixels, disposed on a side of the base substrate; a color film layer, disposed on a side, distal from the base substrate, of the plurality of sub-pixels and including a plurality of color resist sections in one-to-one correspondence to the plurality of sub-pixels; and a plurality of micro-lens structures in one-to-one correspondence to the plurality of sub-pixels, wherein the plurality of micro-lens structures are disposed on a side, distal from the base substrate, of the color film layer, and each of the micro-lens structures is configured to transmit light emitted by a sub-pixel corresponding to the micro-lens structure.

18 Claims, 7 Drawing Sheets

(51) Int. Cl.
*H10K 50/858* (2023.01)
*H10K 50/86* (2023.01)
*H10K 59/50* (2023.01)

(52) U.S. Cl.
CPC .......... *H10K 50/865* (2023.02); *H10K 59/38* (2023.02); *H10K 59/50* (2023.02)

(58) Field of Classification Search
USPC .......................................................... 385/37
See application file for complete search history.

(56) References Cited

U.S. PATENT DOCUMENTS

| | | | | |
|---|---|---|---|---|
| 6,310,717 | B1* | 10/2001 | Naganuma | H01S 3/067 359/341.1 |
| 6,992,718 | B1* | 1/2006 | Takahara | G02F 1/133553 348/333.09 |
| 7,228,013 | B1* | 6/2007 | Bramson | G02B 6/126 385/40 |
| 9,857,621 | B1* | 1/2018 | Gu | G02F 1/133526 |
| 2002/0081067 | A1* | 6/2002 | Brun | G02B 6/3834 385/74 |
| 2005/0238292 | A1* | 10/2005 | Barnes | G02B 6/3846 385/78 |
| 2006/0245695 | A1* | 11/2006 | Fujiwara | G02B 6/3885 385/71 |
| 2007/0097293 | A1* | 5/2007 | Nakanishi | G02B 5/201 349/95 |
| 2008/0084517 | A1* | 4/2008 | Itou | G02F 1/133555 349/62 |
| 2009/0016683 | A1* | 1/2009 | Zheng | G02B 6/3822 385/78 |
| 2010/0214454 | A1* | 8/2010 | Kikuchi | G02B 3/0068 348/308 |
| 2011/0146889 | A1* | 6/2011 | Hwang | B32B 37/025 156/247 |
| 2012/0073330 | A1* | 3/2012 | Tachikura | G02B 6/25 65/412 |
| 2012/0170901 | A1* | 7/2012 | Tachikura | G02B 6/2551 156/359 |
| 2013/0299076 | A1* | 11/2013 | Bradley | G02B 6/02042 156/434 |
| 2017/0153544 | A1* | 6/2017 | Fujiki | G03F 7/16 |
| 2017/0170222 | A1 | 6/2017 | Toda | |
| 2017/0180716 | A1 | 6/2017 | Li et al. | |
| 2017/0201726 | A1* | 7/2017 | Yorikado | G02B 5/003 |
| 2018/0037738 | A1* | 2/2018 | Kuks | G03F 7/0007 |
| 2018/0072892 | A1* | 3/2018 | Armon | C08K 5/3437 |
| 2018/0145113 | A1 | 5/2018 | Sakairi | |
| 2018/0246371 | A1* | 8/2018 | Szwarcman | G02B 27/30 |
| 2020/0219936 | A1 | 7/2020 | Han et al. | |
| 2020/0403038 | A1* | 12/2020 | Kim | H10K 59/38 |
| 2021/0036060 | A1* | 2/2021 | Cho | H10K 30/87 |
| 2021/0057678 | A1 | 2/2021 | Motoyama et al. | |
| 2021/0191198 | A1* | 6/2021 | Musa | C09B 3/10 |
| 2021/0249634 | A1 | 8/2021 | Wang et al. | |
| 2021/0333456 | A1* | 10/2021 | Ishioka | H01L 27/14627 |
| 2021/0384272 | A1* | 12/2021 | Zhang | H10K 59/40 |
| 2022/0115629 | A1* | 4/2022 | Suzuki | G02B 19/0066 |

FOREIGN PATENT DOCUMENTS

| | | | | |
|---|---|---|---|---|
| CN | 107219674 | A | | 9/2017 |
| CN | 109841757 | A | | 6/2019 |
| CN | 112054131 | A | | 12/2020 |
| JP | 2013120731 | A | | 6/2013 |
| JP | 2016015430 | A | | 1/2016 |
| JP | 2019133816 | A | * | 8/2019 .......... H10K 59/124 |

OTHER PUBLICATIONS

CN202010962609.2 first office action.
CN202010962609.2 Notification to grant patent right for invention.

* cited by examiner

FIG. 13

DISPLAY PANEL, DISPLAY DEVICE AND DISPLAY APPARATUS

CROSS-REFERENCE TO RELATED APPLICATION

This application is a U.S. national stage of international application No. PCT/CN2021/110858, filed on Aug. 5, 2021, which claims priority to Chinese Patent Application No. 202010962609.2, filed on Sep. 14, 2020 and entitled "DISPLAY PANEL, DISPLAY DEVICE AND DISPLAY EQUIPMENT," the disclosures of which are incorporated herein by references in their entireties.

TECHNICAL FIELD

The present disclosure relates to the field of display technologies, and more particularly relates to a display panel, a display device, and a display apparatus.

BACKGROUND

Organic light-emitting diode (OLED) display panels have been widely applied due to their advantages of self-luminescence, low drive voltage, fast response, and the like.

SUMMARY

The present disclosure provides a display panel, a display device and a display apparatus. The technical solutions are as follows:

In an aspect, a display panel is provided. The display panel includes:

a base substrate;

a plurality of sub-pixels, disposed on a side of the base substrate;

a color film layer, disposed on a side, distal from the base substrate, of the plurality of sub-pixels and including a plurality of color resist sections in one-to-one correspondence to the plurality of sub-pixels, wherein each of the color resist sections includes a transmission region configured to transmit light and a black matrix region configured to block light; an orthographic projection of the transmission region of the each of the color resist sections on the base substrate being overlapped with an orthographic projection of a sub-pixel corresponding to the color resist section on the base substrate; and a plurality of micro-lens structures in one-to-one correspondence to the plurality of sub-pixels, wherein the plurality of micro-lens structures are disposed on a side, distal from the base substrate, of the color film layer, and each of the micro-lens structures is configured to transmit light emitted by a sub-pixel corresponding to the micro-lens structure;

wherein an axis of the micro-lens structure corresponding to each of the sub-pixels, an axis of the transmission region of the color resist section corresponding to the sub-pixel, and an axis of the sub-pixel are not overlapped with one another, and the axis of the micro-lens structure and the axis of the transmission region of the color resist section are disposed on a same side of the axis of the sub-pixel.

Optionally, the axis of the micro-lens structure corresponding to each of the sub-pixels is disposed on a side, distal from the axis of the sub-pixel, of the axis of the transmission region of the color resist section corresponding to the sub-pixel.

Optionally, a first distance between the axis of each of the sub-pixels and the axis of the micro-lens structure corresponding to the sub-pixel is twice a second distance between the axis of the sub-pixel and the axis of the transmission region of the color resist section corresponding to the sub-pixel.

Optionally, a distance between a first boundary line of the transmission region of the color resist section corresponding to each of the sub-pixels and a first boundary line of the micro-lens structure corresponding to the sub-pixel is equal to the first distance;

a second boundary line of the transmission region of the color resist section corresponding to each of the sub-pixels and a second boundary line of the micro-lens structure corresponding to the sub-pixel are collinear; and the first boundary line of the transmission region of the color resist section and the first boundary line of the micro-lens structure are disposed on one side of the axis of the sub-pixel, and the second boundary line of the transmission region of the color resist section and the second boundary line of the micro-lens structure are disposed on the other side of the axis of the sub-pixel.

Optionally, the axis of each of the sub-pixels, the axis of the micro-lens structure corresponding to the sub-pixel and the axis of the transmission region of the color resist section corresponding to the sub-pixel are arranged in a pixel row direction.

Optionally, the display panel further includes a filling layer, disposed on a side, distal from the base substrate, of the plurality of micro-lens structures;

wherein among the plurality of sub-pixels, a second included angle $\theta 2$ defined by a reference plane and a direction of the light emitted by a target sub-pixels within an edge region of the display panel to a side, distal from the base substrate, of the filling layer satisfies $$\theta 2 = [\arcsin(n1/n2)] \times \sin \theta 1,$$

wherein the reference plane is perpendicular to a bearing surface of the base substrate and the pixel row direction, an extension direction of the edge region of the display panel is perpendicular to the pixel row direction, $\theta 1$ represents a first included angle defined by a direction of the light emitted from the edge region and the reference plane, n1 represents the refractive index of a medium on the side, distal from the base substrate, of the filling layer, and n2 represents the refractive index of the filling layer.

Optionally, a length of each of the micro-lens structures in the pixel row direction is greater than that of each of the sub-pixels in the pixel row direction; and a distance x between a side, distal from the axis of the base substrate, of the target sub-pixel and a side, distal from the axis of the base substrate, of the micro-lens structure corresponding to the target sub-pixel satisfies:

$$x = H \times \tan \theta 2,$$

wherein H represents a distance between the plurality of sub-pixels and the plurality of micro-lens structures in a direction perpendicular to the bearing surface of the base substrate, and the axis is perpendicular to the pixel row direction.

Optionally, a number N of the sub-pixels in the pixel row direction is an even number; and a length w1 of each of the micro-lens structures in the pixel row direction satisfies;

$$w1 = w2 + \frac{x}{N/2},$$

wherein w2 represents a length of each sub-pixel in the pixel row direction.

Optionally, the number N of the sub-pixels in the pixel row direction is an even number; and a first distance h1 between an axis of the y1$^{th}$ micro-lens structure in a direction away from the axis of the base substrate and the axis of the corresponding sub-pixel satisfies:

$$h1 = \frac{x}{N/2} \times y1 - \frac{x}{N},$$

wherein y1 represents a positive integer greater than or equal to 1 and less than or equal to N/2.

A first distance h2 between an axis of the y1$^{th}$ color resist section in the direction away from the axis of the base substrate and the axis of the corresponding sub-pixel satisfies:

$$h2 = \frac{x}{N} \times y1 - \frac{x}{2N}$$

Optionally, a length L1 in the pixel row direction of the transmission region of the y2$^{th}$ color resist section in the direction away from the axis of the base substrate satisfies:

$$L1 = m1 - \frac{x}{N/2} \times (y2 - 1),$$

wherein y2 represents a positive integer greater than or equal to 2 and less than or equal to N/2; and
a distance L2 between the transmission region of the y2$^{th}$ color resist section and the transmission region of the y(2−1)$^{th}$ color resist section in the pixel row direction satisfies:

$$L2 = m2 + \frac{x}{N/2}(y2 - 1),$$

wherein m1 represents a length of the transmission region of each of two color resist sections, most proximal to the axis of the base substrate, in the color film layer in the pixel row direction, and m2 represents a distance between the transmission regions of the two color resist sections, most proximal to the axis of the base substrate, in the color film layer in the pixel row direction.

In another aspect, a display device is provided. The display device includes a drive circuit and the display substrate as defined in the above aspect,
wherein the drive circuit is connected to the plurality of sub-pixels in the display panel and configured to supply a drive signal to each of the sub-pixels.

In yet another aspect, a display apparatus is provided. The display apparatus includes a light transmission system and the display device as defined in the above aspect;

wherein the light transmission system is disposed on a light exit side of the display device and configured to transmit light emitted by the display device.

Optionally, the light transmission system includes: an input grating, an output grating and an optical waveguide; wherein
the input grating is disposed on a light exit side of the display device and at an input end of the optical waveguide, and configured to couple light emitted by the display device to the optical waveguide; and
the output grating is disposed on a light exit side of the optical waveguide and configured to emit the light transmitted in the optical waveguide into an imaging space for imaging.

Optionally, the light transmission system further includes: a collimator,
wherein the collimator is disposed between the light exit side of the display device and the input grating, and configured to collimate the light emitted by the display device and transmit the light into the input grating.

Optionally, the display apparatus is a virtual reality device or an augmented reality device.

BRIEF DESCRIPTION OF THE DRAWINGS

For clearer descriptions of the technical solutions in the embodiments of the present disclosure, the following briefly introduces the accompanying drawings required for describing the embodiments. Apparently, the accompanying drawings in the following description illustrate merely some embodiments of the present disclosure, and a person of ordinary skill in the art may still derive other drawings from these accompanying drawings without creative efforts.

DETAILED DESCRIPTION

For clearer descriptions of the objectives, technical solutions, and advantages of the present disclosure, embodiments of the present disclosure are described in detail hereinafter with reference to the accompanying drawings.

In the related art, an OLED display panel may include: a plurality of OLED sub-pixels of different colors. Each of the OLED sub-pixels includes an anode layer, a cathode layer, and a luminous layer disposed between the anode layer and the cathode layer. The luminous layer is capable of emitting light under the drive of the anode layer and the cathode layer.

However, the utilization rate of the light emitted by the OLED sub-pixels in the related art is low.

Figure 1:
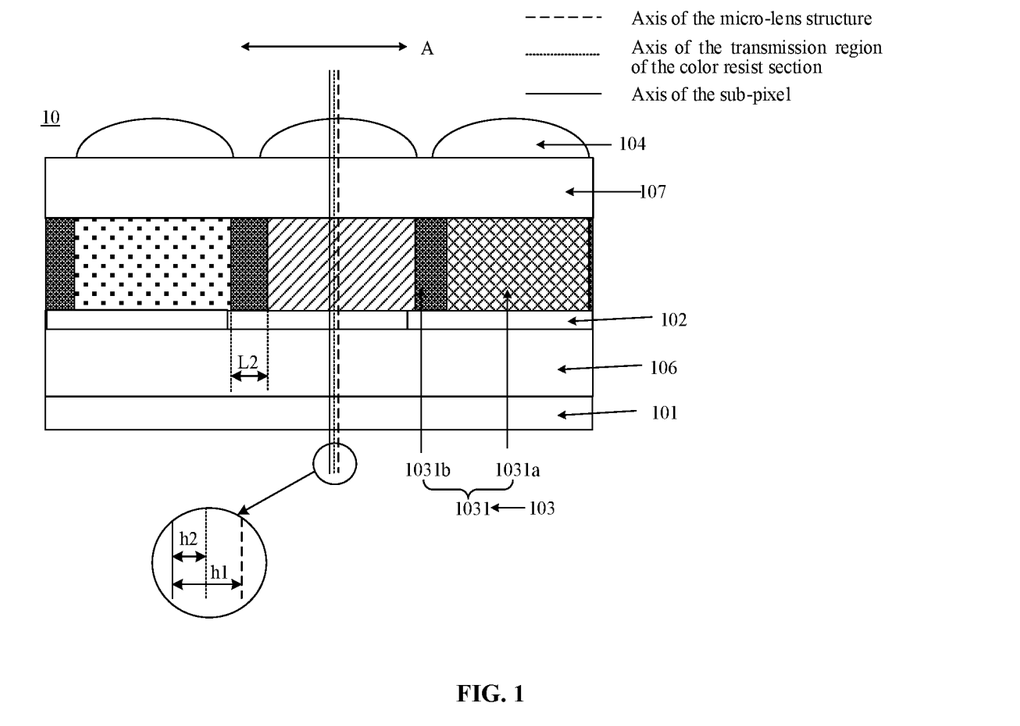
FIG. 1 is a schematic structural diagram of a display panel according to an embodiment of the present disclosure.

FIG. 1 is a schematic structural diagram of a display panel 10 according to an embodiment of the present disclosure. As illustrated in FIG. 1, the display panel 10 may include: a base substrate 101, a plurality of sub-pixels 102, a color film layer 103, and a plurality of micro-lens structures 104 in one-to-one correspondence to the plurality of sub-pixels 102.

The plurality of sub-pixels 102 may be disposed on a side of the base substrate 101. The color film layer 103 may be disposed on a side, distal from the base substrate 101, of the plurality of sub-pixels 102. The plurality of micro-lens structures 104 may be disposed on a side, distal from the base substrate 101, of the color film layer 103; and each micro-lens structure 104 may be configured to transmit light emitted by one corresponding sub-pixel 102.

The color film layer 103 may include: a plurality of color resist sections 1031 in one-to-one correspondence to the plurality of sub-pixels 102 and are spaced apart from each other. Each color resist section may include: a transmission region 1031a configured to transmit light and a black matrix region 1031b configured to block light. The sub-pixels 102, the transmission regions 1031a of the color resist sections 1031 and the micro-lens structures 104 may be numerically equal. FIG. 1 illustrates three sub-pixels 102, three micro-lens structures 104 and three transmission regions 1031a of color resist sections 1031.

An orthographic projection of the transmission region 1031a of each color resist section 1031 on the base substrate 101 is overlapped with that of the corresponding sub-pixel 102 on the base substrate 101. Referring to FIG. 1, for each sub-pixel 102, an axis of the micro-lens structure 104 corresponding to the sub-pixel 102, an axis of the transmission region 1031a of the color resist section 1031 corresponding to the sub-pixel 102 and an axis of the sub-pixel 102 are not overlapped with one another; and the axis of the micro-lens structure 104 and the axis of the transmission region 1031a of the color resist section 1031 may be disposed on the same side of the axis of the sub-pixel 102.

Since the plurality of micro-lens structures 104 are disposed in the display panel 10, among the light emitted by the sub-pixels 102, not only the light at smaller angles can go out, but also the light at larger angles can go out through the corresponding micro-lens structures 104 such that the utilization rate of the light emitted by the sub-pixels 102 is increased.

Moreover, the orthographic projection of the transmission region 1031a of each color resist section 1031 on the base substrate 101 is overlapped with that of the corresponding sub-pixel on the base substrate 101, such that the light emitted by each sub-pixel 102 may go out through the transmission region 1301a of the corresponding color resist section 1031 in the color film layer 103, and the color gamut of the display panel 10 is higher.

Figure 2:
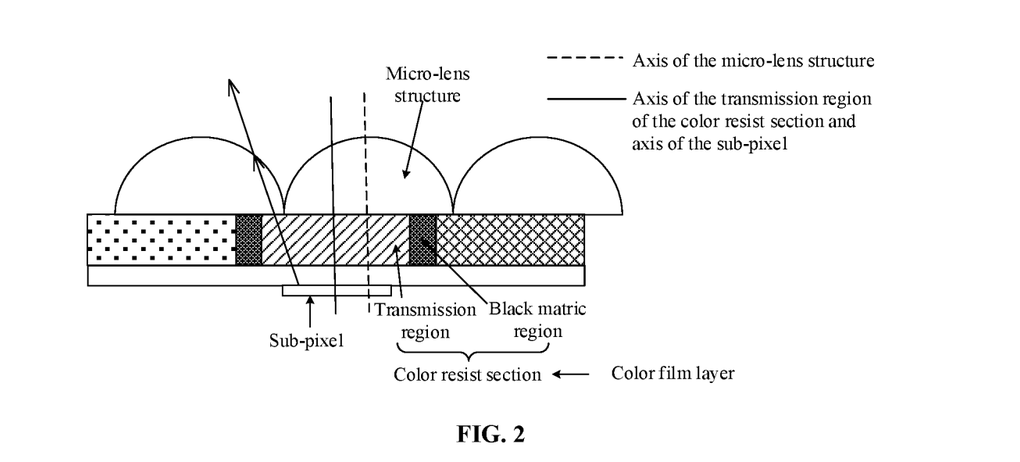
FIG. 2 is a schematic diagram of crosstalk of a display panel in the related art.

Furthermore, referring to FIG. 2, in the related art, an axis of a micro-lens structure shifts relative to that of a sub-pixel, while an axis of a transmission region of a color resist section does not shift relative to that of the sub-pixel. In this case, the light emitted by the sub-pixel can exit through the transmission region of the color resist section corresponding to the sub-pixel, and irradiate a micro-lens structure corresponding to a sub-pixel adjacent to the former sub-pixel, resulting in relatively obvious crosstalk of the sub-pixels.

Figure 3:
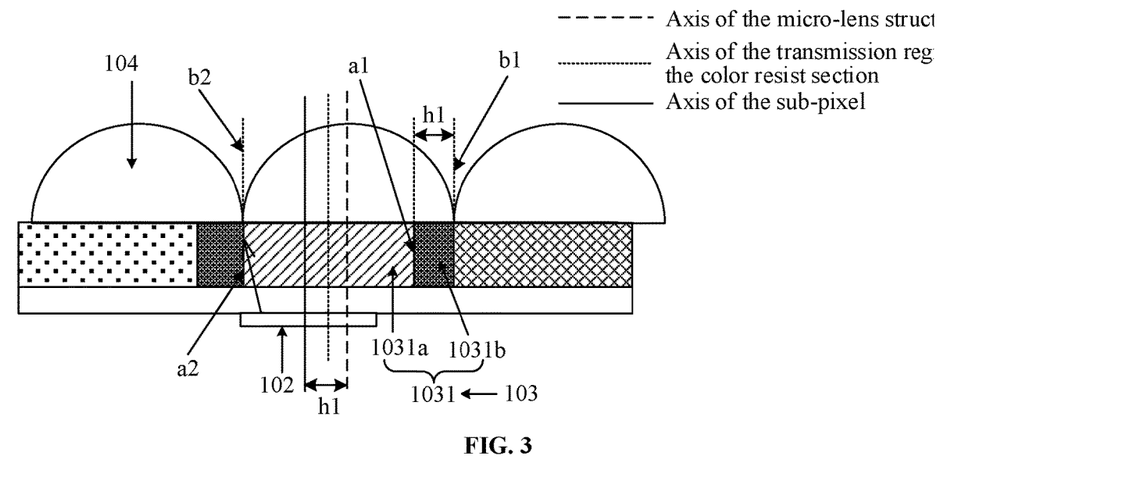
FIG. 3 is a schematic diagram of a display panel without crosstalk according to an embodiment of the present disclosure.

Referring to FIG. 3, both an axis of a micro-lens structure 104 and an axis of a transmission region 1031a of a color resist section 1031 shift in a same direction relative to that of a sub-pixel 102. In this case, the light emitted by the sub-pixel 102 may irradiate the black matrix region 1031b of the color resist section 1301 and is unable to irradiate the micro-lens structure 104 corresponding to a sub-pixel adjacent to the former sub-pixel 102, such that the crosstalk of the sub-pixel 102 is mitigated, and the display effect of a display panel 10 is enhanced.

In summary, the embodiments of the present disclosure provide a display panel. The display panel includes a base substrate, a plurality of sub-pixels, a color film layer and a plurality of micro-lens structures. By arranging the plurality of micro-lens structures, light at a larger angle among the light emitted by each sub-pixel may be caused to exit through the corresponding micro-lens structure, such that the utilization rate of the light emitted by the sub-pixels is increased. Moreover, since the axis of the micro-lens structure, the axis of the transmission region of the color resist section in the color film layer and the axis of the sub-pixel are not overlapped with one another, that is, the axis of the micro-lens structure and the axis of the transmission region of the color resist section in the color film layer shift relative to that of the sub-pixel, thereby preventing the light emitted by the sub-pixel from exiting through the micro-lens structure corresponding to an adjacent sub-pixel. In this way, the crosstalk of light emitted by adjacent sub-pixels is mitigated, and the display effect of the display panel is enhanced.

Optionally, the plurality of color resist sections 1031 in the color film layer 103 are of different colors, for example, each of the color resist sections 1031 in the color film layer 103 may be red (R), green (G), or blue (B), and each two adjacent color resist sections 1031 have different colors.

In some embodiments of the present disclosure, referring to FIG. 1 and FIG. 3, for each sub-pixel 102, the axis of the micro-lens structure 104 corresponding to the sub-pixel 102 may be disposed on a side, distal from the axis of the sub-pixel 102, of the transmission region 1031a of the color resist section 1031 corresponding to the sub-pixel 102.

That is, for each sub-pixel 102, a first distance h1 between the axis of the sub-pixel 102 and the axis of the corresponding micro-lens structure 104 may be greater than a second distance h2 between the axis of the sub-pixel 102 and the axis of the transmission region 1031a of the corresponding color resist section 1031. Optionally, the first distance h1 may be twice the second distance h2, that is, h1=2×h2.

In some embodiments of the present disclosure, referring to FIG. 3, for each sub-pixel 102, a distance between a first boundary line a1 of the transmission region 1031a of the color resist section 1031 corresponding to the sub-pixel 102 and a first boundary line b1 of the micro-lens structure 104 corresponding to the sub-pixel may be equal to the first distance h1. Moreover, for each sub-pixel 102, a second boundary line a2 of the transmission region 1031a of the color resist section 1031 corresponding to the sub-pixel 102 and a second boundary line b2 of the micro-lens structure 104 corresponding to the sub-pixel 102 may be collinear.

The first boundary line a1 of the transmission region 1031a of the color resist section 1031 and the first boundary line b1 of the micro-lens structure 104 are disposed on one side of the axis of the sub-pixel 102, and the second boundary line a2 of the transmission region 1031a of the color resist section 1031 and the second boundary line b2 of the micro-lens structure 104 are disposed on the other side of the axis of the sub-pixel 102.

Referring to FIG. 1, for each sub-pixel 102, the axis of the sub-pixel 102, the axis of the micro-lens structure 104 corresponding to the sub-pixel and the axis of the transmission region 1031a of the color resist section 1031 corresponding to the sub-pixel 102 may be arranged in a pixel row direction A. That is, the micro-lens structure 104 and the transmission region 1031a of the color resist section 1031 may shift in the pixel row direction A relative to the sub-pixel 102.

Figure 4:
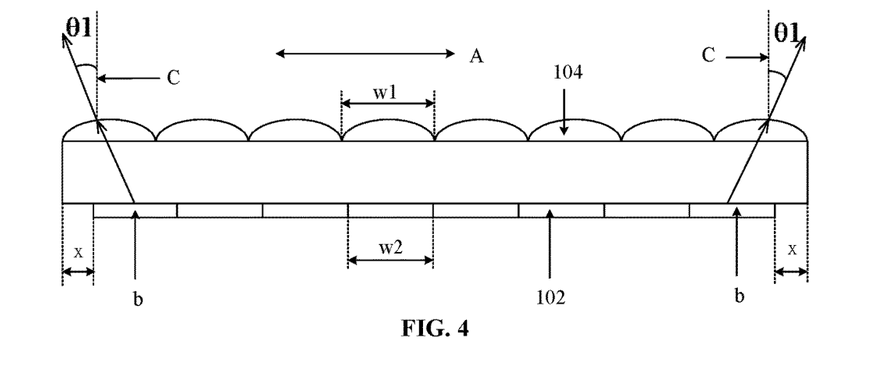
FIG. 4 is a schematic diagram of a first included angle according to an embodiment of the present disclosure.
Figure 5:
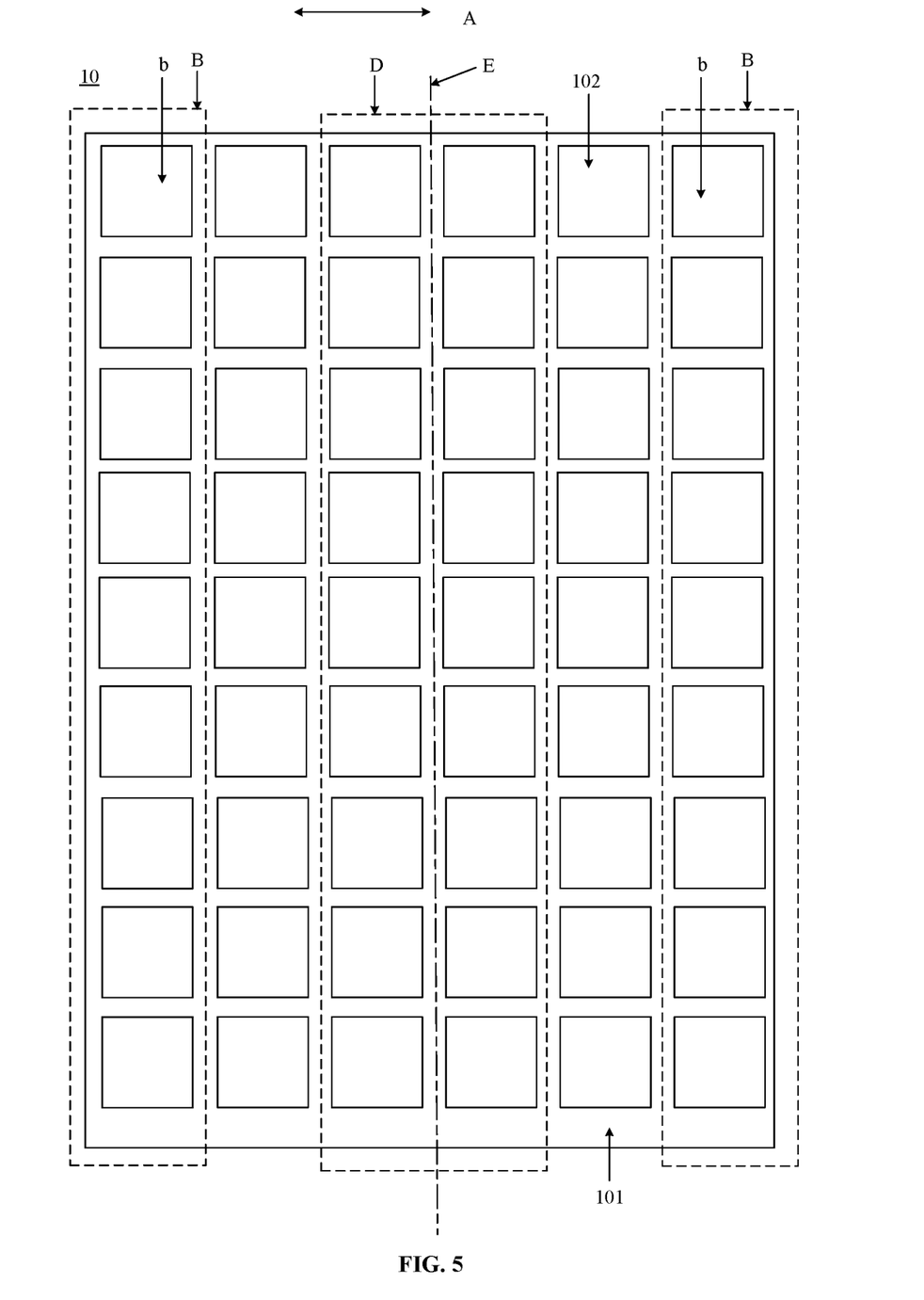
FIG. 5 is a top view of a display panel according to an embodiment of the present disclosure.

In some embodiments of the present disclosure, referring to FIG. 4 and FIG. 5, first included angles θ1 defined by directions of the light emitted from edge regions B of the display panel 10 and reference planes C may be predetermined included angles that the light emitted from the edge regions B of the display panel 10 needs to reach. The first included angles θ1 may be determined according to the requirements of an application scenario, and may also be referred to as custom angles. The directions of the light emitted from the edge regions B of the display panel 10 may refer to those of the brightest light among the light emitted by target sub-pixels b in the edge regions B of the display panel. The target sub-pixels b may include the first column of sub-pixels and the last column of sub-pixels in the display panel 10.

The reference planes C may be perpendicular to a bearing surface of a base substrate 101 and the pixel row direction A, and an extension direction of the edge regions B of the display panel 10 is perpendicular to the pixel row direction A. Optionally, the first included angles θ1 may be greater than 10 degrees.

It should be noted that FIG. 4 and FIG. 5 are only intended to illustrate the edge regions B and the first included angles θ1, and thus the number of micro-lens structures 104 and the number of sub-pixels 102 in FIG. 4 and FIG. 5 do not represent those in an actual product.

Figure 6:
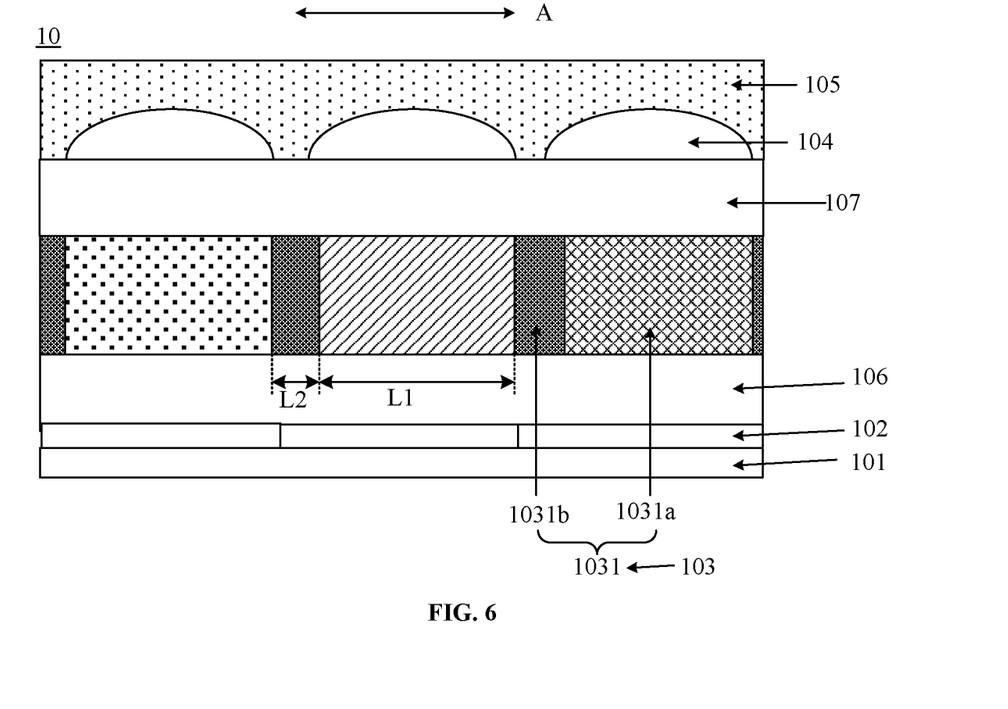
FIG. 6 is a schematic structural diagram of another display panel according to an embodiment of the present disclosure.
Figure 7:
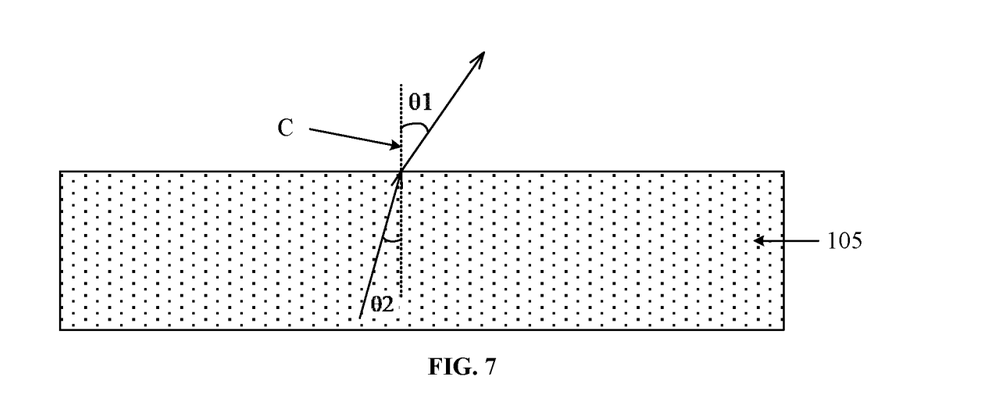
FIG. 7 is a schematic diagram of refraction of light irradiated on a filling layer according to an embodiment of the present disclosure.

Referring to FIG. 6, a display panel 10 further includes a filling layer 105 that is disposed on a side, distal from a base substrate 101, of a plurality of micro-lens structures 104. FIG. 7 is a schematic diagram of refraction of light shone on a filling layer according to an embodiment of the present disclosure. Referring to FIG. 7, according to the law of refraction, among a plurality of sub-pixels 102 of a display panel 10, second included angles θ2 defined by reference planes C and directions of the light emitted by the target sub-pixels b within the edge regions B of the display panel 10 to a side, distal from a base substrate 101, of the filling layer 10S satisfy:

$$\theta 2 = [\arcsin(n1/n2)] \times \sin \theta 1 \qquad \text{Equation (1).}$$

n1 may represent the index of refraction of a medium on the side, distal from the base substrate 101, of the filling layer 105, and n2 may represent the index of refraction of the filling layer 105.

Optionally, the index of refraction of the filling layer 105 may be 1.42, that is, n2=1.42. Moreover, the medium on the side, distal from the base substrate 101, of the filling layer 105 may be air, that is, n1=1.

Figure 8:
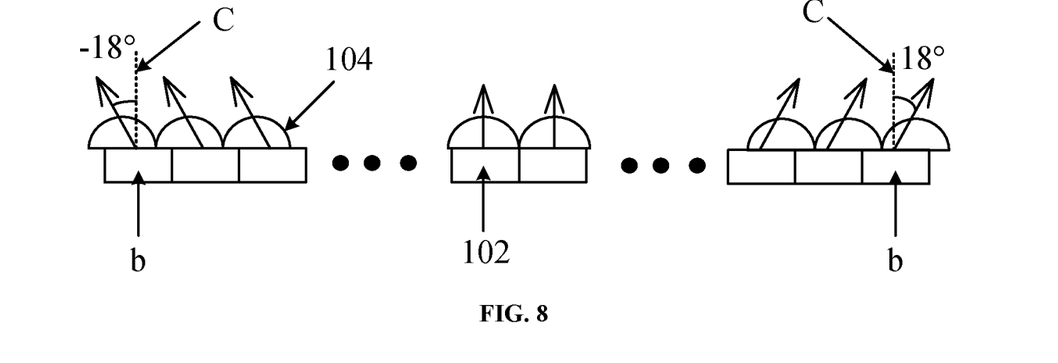
FIG. 8 is a schematic diagram of another first included angle according to an embodiment of the present disclosure.

Based on Equation (1), the second included angles θ2 are determined according to the first included angles θ1. In an exemplary embodiment, referring to FIG. 8, assuming that the angles defined by the target sub-pixels in the edge region B on a left side of the display panel 10 and the reference plane C are −18 degrees, and the angles defined by the target sub-pixels in the edge region B on a right side of the display panel 10 and the reference plane C are 18 degrees, that is, the first included angles θ1 may be 18 degrees, the second included angles θ2=[arcsin(1/1.42)]×sin 18°=12.57° may be determined according to Equation (1).

In some embodiments of the present disclosure, the length of each micro-lens structure 104 in the pixel row direction A may be greater than that of each sub-pixel 102 in the pixel row direction A. In addition, both the axes of the plurality of micro-lens structure 104 and the axes of the plurality of sub-pixels 102 are caused to be collinear with the axis of the base substrate 101. Since the lengths of the micro-lens structures 104 in the pixel row direction A are greater than those of the sub-pixels 102 in the pixel row direction A, each sub-pixel 102 is staggered from the corresponding micro-lens structure 104, and each of the target sub-pixels b in the edge regions B of the display panel 10 is staggered from the corresponding micro-lens structure 104 for the largest distance.

Figure 9:
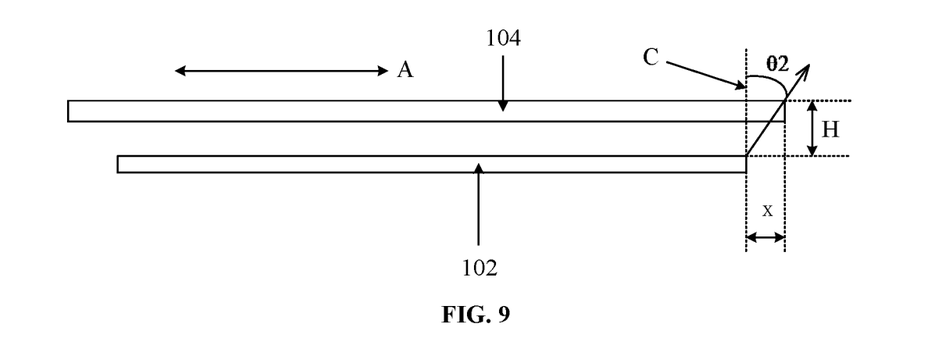
FIG. 9 is a schematic diagram of a distance between a side, distal from an axis of the base substrate, of a target sub-pixel and a side, distal from the axis of the base substrate, of a micro-lens structure corresponding to the target sub-pixel according to an embodiment of the present disclosure.

Optionally, referring to FIG. 9, a distance x between a side, distal from an axis of a base substrate 101, of each target sub-pixel b and a side, distal from the axis of the base substrate 101, of a micro-lens structure 104 corresponding to the target sub-pixel satisfies:

$$x = H \times \tan \theta 2 \qquad \text{Equation (2).}$$

In the above equation, H represents a distance between a plurality of sub-pixels 102 and the plurality of micro-lens structures 104 in a direction perpendicular to the bearing surface of the base substrate 101, and the axis of the base substrate 101 is perpendicular to the pixel row direction A.

In an exemplary embodiment, assuming that His 2.95 micrometers (μm) and the second included angle θ2 is 12.57°, the distance x may be calculated according to Equation (2), that is, x=2.95×tan 12.57°=0.6577815224 μm.

It should be noted that FIG. 9 only illustrates a layer where the plurality of micro-lens structures 104 are disposed and a layer where the plurality of sub-pixels 102 are disposed to illustrate the relationship among the second included angle θ2, the distance H, and the distance x, but does not illustrate the specific structures of the sub-pixels 102 and the micro-lens structures 104.

In some embodiments of the present disclosure, the number of sub-pixels in the pixel row direction A may be an even number, for example, N=6 in FIG. 5. The axis E of symmetry of every two adjacent sub-pixels in a middle region D of the display panel 10 is collinear with the axis of the base substrate 101, and the same number of sub-pixels are arranged on the side, distal from the axis of the base substrate 101, of each of the two adjacent sub-pixels.

That is, in the pixel row direction A, the number of sub-pixels 102 on each of two sides of the axis of the base substrate 101 is N/2, taking any point on the axis of the base substrate 101 as an origin. Since the difference between a total length of N/2 sub-pixels 102 and a total length of N/2 micro-lens structures 104 is x according to the above calculation, the difference between the length of one sub-pixel 102 and the length of one micro-lens structure 104 is x/(N/2).

Thus, referring to FIG. 4, the length w1 of each micro-lens structure 104 in the pixel row direction A may satisfy:

$$w1 = w2 + \frac{x}{N/2}. \quad \text{Equation (3)}$$

In the above equation, w2 represents the length of each sub-pixel 102 in the pixel row direction A.

In an exemplary embodiment, assuming that w2=3.0003426 μm and N=1920, the length w1 of each micro-lens structure 104 in the pixel row direction A is determined according to Equation (3), that is, w1=3.0003426+0.6577815224/(1920/2)=3.0010576 μm.

In some embodiments of the present disclosure, referring to FIG. 1, a first distance h1 between an axis of the y1$^{th}$ sub-pixel 102 in the direction away from the axis of the base substrate 101 and the axis of the corresponding micro-lens structure 104 satisfies:

$$h1 = \frac{x}{N/2} \times y1 - \frac{x}{N}. \quad \text{Equation (4)}$$

In the above equation, y1 represents a positive integer greater than or equal to 1 and less than or equal to N/2. Since positions of the sub-pixels 102 in the display panel 10 are fixed, a position of the axis of each micro-lens structure 104 in the display panel 104 may be determined according to Equation (4). In addition, the arrangement of the micro-lens structures 104 on the base substrate 101 may be determined according to the length of the micro-lens structures 104 in the pixel row direction A, which is determined according to Equation (3).

In an exemplary embodiment, assuming that y1=N/2, the first distance h1 between the axis of each of the target sub-pixels b in the edge regions B of the display panel 10 and the axis of the corresponding micro-lens structure 104 is obtained, that is, h1=x−x/N.

As seen from Equation (4), the first distance h1 may be positively correlated with y1 That is, the further the sub-pixels are distal from the axis of the base substrate 101, the greater y1 and the corresponding first distance h1 are, while the more proximal the sub-pixels are to the axis of the base substrate 101, the less y1 and the corresponding first distance h1 are.

In some embodiments of the present embodiment, the first distance h1 is twice the second distance h2, and thus the second distance h2 may satisfy:

$$h2 = \frac{x}{N} \times y1 - \frac{x}{2N}. \quad \text{Equation (5)}$$

Since the positions of the sub-pixels 102 in the display panel 10 are fixed, a position of the axis of the transmission region 1031a of each color resist section 1031 in the color film layer 103 in the display panel 10 may be determined according to Equation (5).

In some embodiments of the present embodiment, a length L1 in the pixel row direction A of the transmission region 1031a of the y2$^{th}$ color resist section 1031 in the direction away from the axis of the base substrate 101 satisfies:

$$L1 = m1 - \frac{x}{N/2} \times (y2 - 1). \quad \text{Equation (6)}$$

In the above equation, y2 represents a positive integer greater than or equal to 2 and less than or equal to N/2; and m1 represents a length in the pixel row direction A of the transmission region 1031a of each of the two color resist sections, most proximal to the axis of the base substrate 101, in the color film layer 103. As seen from Equation (6), the length of the transmission region 1031a of the color resist section 1031 that is more proximal to the axis of the base substrate 101 is greater in the pixel row direction A, while the length of the transmission region 1031a of the color resist section 1031 that is further distal from the axis of the base substrate 101 is less in the pixel row direction A.

In an exemplary embodiment, assuming m1=3 μm, N=1920, and y2=N/2, the length L1 in the pixel row direction of the transmission region 1031a of the y2$^{th}$ color resist section may be determined according to Equation (6), that is, L1=3−[0.6577815224/(1920/2)]×(1920/2−1) =2.34290366669 μm.

Since the transmission regions 1031a of the color resist sections 1031 corresponding to the sub-pixels 102 have different lengths in the pixel row direction A, the black matrix regions 1031b, each of which is formed by superposition of two adjacent color resist sections 1031, have different lengths in the pixel row direction A, and thus the total length of the color film layer 103 may be guaranteed to be unchanged. In addition, the total increased length of the black matrix regions 1031b may be equal to the total decreased length of the transmission regions 1031a.

Optionally, a distance L2 between the transmission region of the y2$^{th}$ color resist section 1031 and the transmission region of the (y2−1)$^{th}$ color resist section 1031 in the pixel row direction A (that is, the length of the black matrix region 1031b formed by superposition of the y2$^{th}$ color resist section 1031 and the (y2−1)$^{th}$ color resist section 1031) satisfies:

$$L2 = m2 + \frac{x}{N/2}(y2 - 1). \quad \text{Equation (7)}$$

In the above equation, m2 represents a distance in the pixel row direction A between the transmission regions 1031a, most proximal to the axis of the base substrate 101, of two color resist sections 1031. Referring to Equation (7), the distance in the pixel row direction A between the transmission regions 1031a of two color resist sections 1031 that are more proximal to the axis of the base substrate 101 is less, while the distance in the pixel row direction A between the transmission regions 1031a of two color resist sections 1031 that are further distal from the axis of the base substrate 101 is greater.

In an exemplary embodiment, assuming that m2=0.3 μm, N=1920, and y2=N/2, the distance L2 in the pixel row direction A between the transmission region 1031a of the y2$^{th}$ color resist section 1031 and the transmission region 1031a of the (y2−1)$^{th}$ color resist section 1031 may be determined according to Equation (7), that is, L2=0.3+ [0.6577815224/(1920/2)]=×(1920/2−1)=0.95870963333 μm.

The results of detection of a view angle range of the display panel including the plurality of micro-lens structures in the related art are illustrated in Table 1. In the display panel in the related art, the axes of the micro-lens structures shift relative to those of the sub-pixels, the axes of the transmission regions of the color resist sections in the color film layer do not shift relative to those of the sub-pixels, and the distance between every two adjacent color resist sections in the color film layer is less (for example, 0.2 μm).

TABLE 1

| Distances (μm) between the axes of the sub-pixels and the axes of the micro-lens structures | 0 | 0.2 | 0.4 | 0.6 | 0.8 |
|---|---|---|---|---|---|
| Included angles defined by the directions of the light emitted from the display panel and reference planes | 0° | 5° | 10° | 15° | 21° |
| View angle range | −33°-33° | −26°-36° | −19°-39° | −12°-42° | −4°-49° |
| Theoretical view angle range | −30°-30° | −26°-35° | −20°-40° | −15°-45° | −9°-51° |
| Does the view angle range satisfy the requirement? | Yes | Yes | No | No | No |

As listed in Table 1, in the case that the distances between the axes of the sub-pixels and the axes of the micro-lens structures are 0 μm, the included angles defined by the directions of the light emitted from the display panel and the reference planes are 0°, and the view angle range is ±33°. In the case that the distances between the axes of the sub-pixels and the axes of the micro-lens structures are 0.8 μm, the included angles defined by the directions of the light emitted from the display panel and the reference planes are 21.14°, and the view angle range is ±25°.

That is, the smaller the distances between the axes of the sub-pixels and the axes of the micro-lens structures are, the smaller the included angles defined by the directions of the light emitted from the display panel and the reference planes are, and the larger the view angle range is. The greater the distances between the axes of the sub-pixel and the axes of the micro-lens structure are, the greater the included angles defined by the directions of the light emitted from the display panel and the reference planes are, and the smaller the view angle range is.

Therefore, in the related art, in the case where the first included angles defined by the directions of the light emitted from the edge ranges of the display panel and the reference planes are greater, the view angle range of the light emitted from the display panel is smaller and may not satisfy the requirement.

In an exemplary embodiment, assuming that the required view angle range is ±30°, referring to Table 1, in the case that the included angles defined by the directions of the light emitted from the display panel and the reference planes are greater than 10°, the detected view angle range is less than the theoretical view angle range and does not satisfy the requirement. Therefore, the included angles θ1 defined by the directions of the light emitted by the target sub-pixels in the edge regions of the display panel and the reference planes C may only be less than 10°.

With the size and position designs of the micro-lens structures 104, and the size and position designs of the transmission regions 1031a and black matrix regions 1031b of the color resist sections 1031, implemented and provided by the present disclosure, in the case where the included angles defined by the directions of the light emitted from the display panel 10 and the reference planes C are different, a contrast (CR) view angle range, a color error view angle range and a brightness decay view angle range of the display panel 10 are detected, and the detection results are illustrated in Table 2. In addition, whether the view angle range satisfies the requirement or not may be determined based on whether the union of the three detected view angle ranges is greater than the theoretical view angle range or not.

The brightness decay view angle range is the range of the angles defined by the direction of the light, which is emitted by the sub-pixels and has 50% brightness of the brightest light emitted by the sub-pixels, and the direction of the brightest light.

TABLE 2

| Included angles defined by the directions of light emitted from the display panel and the reference planes | 0° | 5° | 11° | 16° | 19° |
|---|---|---|---|---|---|
| Theoretical view angle range | −33°-33° | −28°-38° | −22°-44° | −17°-49° | −14°-52° |
| CR view angle range | −38°-38° | −27°-42° | −27°-47° | −25°-46° | −23°-47° |
| Color error view angle range | −42°-42° | −33°-47° | −32°-51° | −29°-53° | −27°-59° |
| Brightness decay view angle range | −31°-31° | −26°-36° | −19°-41° | −15°-45° | −13°-47° |
| Does the view angle range satisfy the requirement? | Yes | Yes | Yes | Yes | Yes |

As listed in Table 2, assuming that the view angle range is required to be ±33°, in the case that the included angles defined by the directions of the light emitted from the display panel and the reference planes are 19°, the theoretical view angle range is −14° to 52°. The detected CR view angle range is −23° to 47°, the detected color error view angle range is −27° to 59°, and the detected brightness decay view angle range is −13° to 47°. According to the union of the three detected view angle ranges, it can be determined that in the case that the angles defined by the directions of the light emitted from the display panel 10 and the reference planes C are 19 degrees, the view angle range still satisfies the requirement. Therefore, the first included angles θ1 defined by the directions of the light emitted by the target sub-pixels b in the edge regions B of the display panel 10 and the reference planes C are caused to be greater than 10°.

Figure 10:
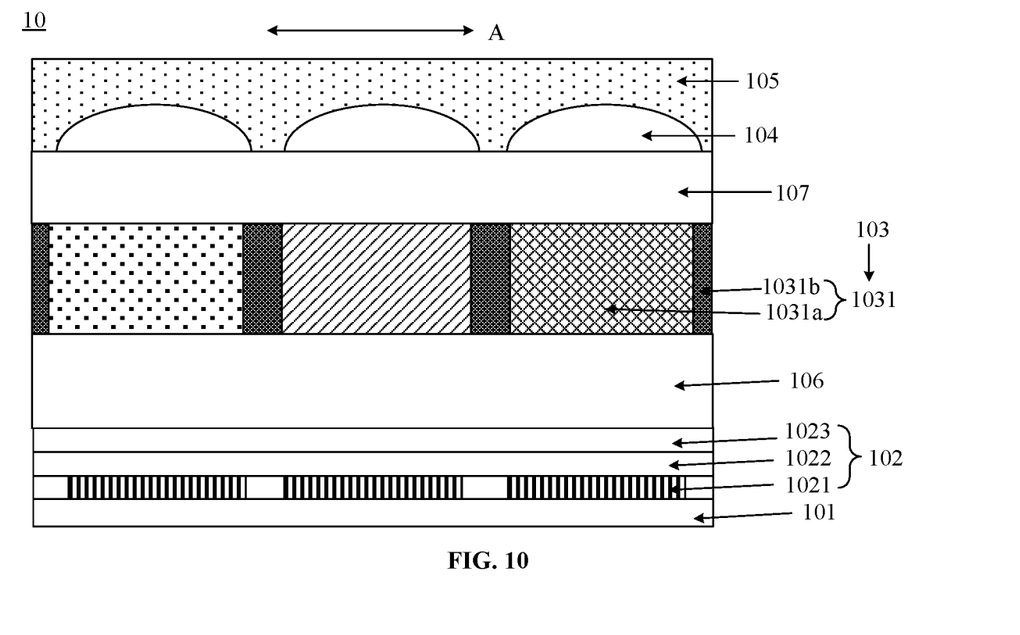
FIG. 10 is a schematic structural diagram of yet another display panel according to an embodiment of the present disclosure.

FIG. 10 is a schematic structural diagram of another display panel 10 according to an embodiment of the present disclosure. As illustrated in FIG. 10, a sub-pixel 102 may include an anode layer 1021, a light-emitting layer 1022, and a cathode layer 1023, which are sequentially stacked in the direction of being distal from a base substrate 101. The plurality of sub-pixels 102 in the display panel 10 emit white light according to the embodiment of the present disclosure. A color film layer 103 is disposed on a side, distal from the base substrate 101, of the sub-pixels 102, such that the white light may be changed into light of a plurality of different colors after passing through the color resist sections of different colors in the color film layer 103, and the color gamut of the display panel 10 is higher.

As illustrated in FIG. 1, FIG. 6, and FIG. 10, the display panel 10 may further include a first encapsulation film layer 106 and a second encapsulation film layer 107.

The first encapsulation film layer 106 may be disposed on a side, distal from the base substrate 101, of the cathode layer 1023 and the second encapsulation film layer 107 may be disposed on a side, distal from the base substrate 101, of the color film layer 103.

The first encapsulation film layer 106 and the second encapsulation film layer 107 may be formed by a manufacturing process such as chemical vapour deposition (CVD) or ink jet printing (IJP).

Optionally, each of the first encapsulation film layer 106 and the second encapsulation film layer 107 may include: an inorganic film layer and an organic film layer. The inorganic film layer may be prepared from an inorganic material, for example, one of SiO, SiN, SiON, and $Al_2O_3$. The organic film layer may be prepared from an organic material, for example, an acrylic material.

In summary, the embodiments of the present disclosure provide a display panel. The display panel includes a base substrate, a plurality of sub-pixels, a color film layer, and a plurality of micro-lens structures. The plurality of micro-lens structures, such that light at a larger angle among the light emitted by each sub-pixel is caused to exit through the corresponding micro-lens structure, and the utilization rate of the light emitted by the sub-pixels is improved. Moreover, since the axis of the micro-lens structure, the axis of the transmission region of the color resist section in the color film layer, and the axis of the sub-pixel are not overlapped with one another, that is, the axis of the micro-lens structure and the axis of the transmission region of the color resist section in the color film layer shift relative to that of the sub-pixel, thereby preventing the light emitted by the sub-pixel from exiting through the micro-lens structure corresponding to an adjacent sub-pixel. In this way, the crosstalk of light emitted by adjacent sub-pixels is mitigated, and the display effect of the display panel is enhanced.

Figure 11:
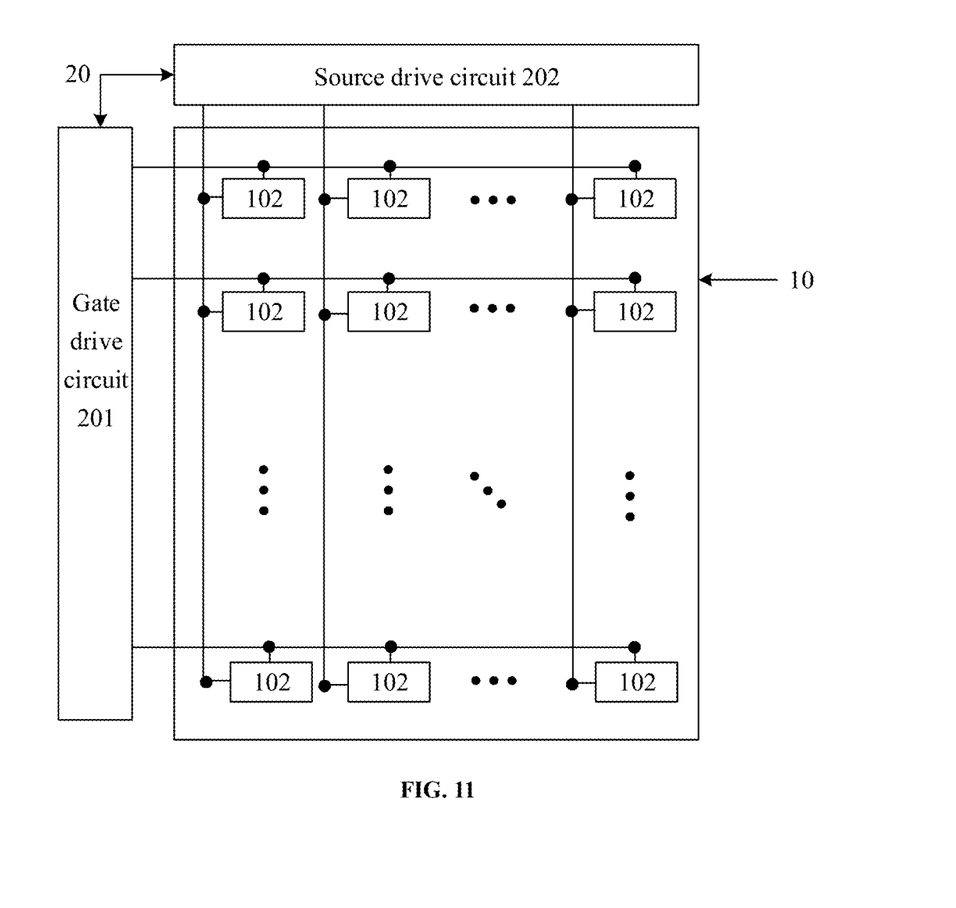
FIG. 11 is a schematic structural diagram of a display device according to an embodiment of the present disclosure.

FIG. 11 is a schematic structural diagram of a display device 00 according to an embodiment of the present disclosure. As illustrated in FIG. 11, the display device 00 may include: a drive circuit 20 and a display panel 10 provided by the above-described embodiments. The drive circuit 20 is connected to the plurality of sub-pixels 102 in the display panel 10 and is configured to supply a drive signal to each of the sub-pixels.

As illustrated in FIG. 11, the drive circuit 20 includes a gate drive circuit 201 and a source drive circuit 202. The gate drive circuit 201 may be connected to each row of sub-pixels 102 in the display panel 10 through a gate line and is configured to supply drive signals to each row of sub-pixels 102. The source drive circuit 202 may be connected to each column of sub-pixels 102 in the display panel 10 through a data line and is configured to supply data signals to each column of sub-pixels 102.

Optionally, the display device may be any product or component having a display function and a fingerprint recognition function, such as an OLED display device, electronic paper, a mobile phone, a tablet computer, a television, a display, a notebook computer, a digital photo frame or a navigation device.

Figure 12:
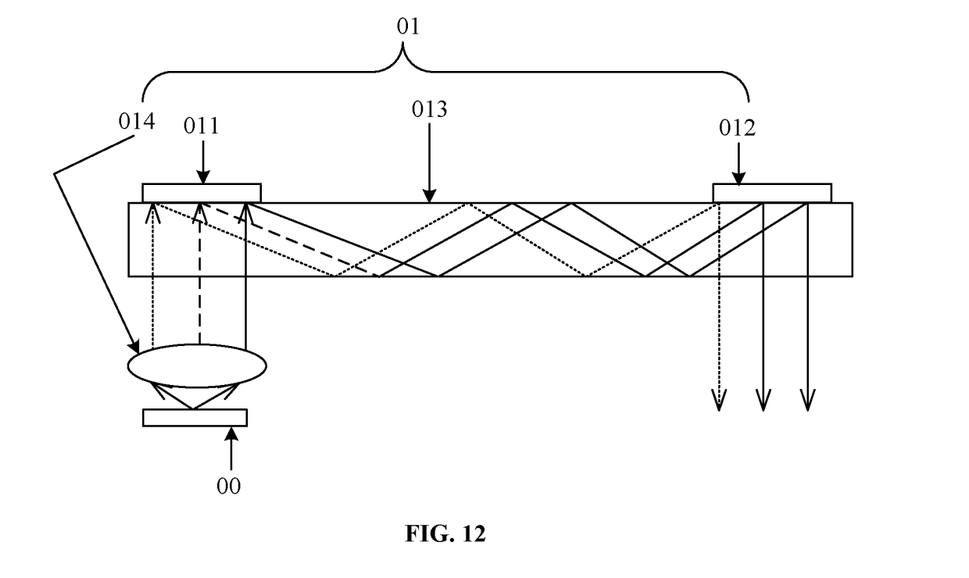
FIG. 12 is a schematic structural diagram of a display apparatus according to an embodiment of the present disclosure.

FIG. 12 is a schematic structural diagram of a display apparatus 00 according to an embodiment of the present disclosure. As illustrated in FIG. 12, the display apparatus 00 may include: a light transmission system 01 and the display device 00 provided by the above-described embodiment. The light transmission system 01 may be disposed on a light exit side of the display device 00 and is configured to transmit the light emitted by the display device 00.

As illustrated in FIG. 12, the light transmission system 01 may include: an input grating 011, an output grating 012 and an optical waveguide 013. The input grating 011 may be disposed on the light exit side of the display device 00 and at an input end of the optical waveguide 013, and is configured to couple the light emitted by the display device 00 to the optical waveguide 013. The output grating 012 may be disposed on a light exit side of the optical waveguide 013 and is configured to emit the light transmitted in the optical waveguide 013 into an imaging space; and the imaging space is configured to image.

In some embodiments of the present disclosure, the input grating 011 may be a relief grating engraved at an input end of the optical waveguide 013, and the output grating 012 may be a relief grating engraved at the output end of the optical waveguide 013. that is, the input grating 011, the output grating 012 and the optical waveguide 013 are integrated. Or the input grating 011 and the output grating 012 may be diffraction gratings.

As illustrated in FIG. 12, the light transmission system 01 may further include: a collimator 014. The collimator 014 may be disposed between the light exit side of the display device 00 and the input grating 011, and is configured to collimate the light emitted by the display device 00 and then transmit the light into the input grating 011.

In some embodiments of the present disclosure, among the light emitted by the display device 00, the light which defines an angle of −30° to 30° together with the brightest light may be effectively transmitted in the optical waveguide 013. That is, the light which defines the angle of −30° to 30° together with the brightest light may be effectively used by the optical waveguide 013. As a result, the view angle range of the display panel 10 in the display device 00 being −30° to 30° is to achieve a larger light utilization rate.

Figure 13:
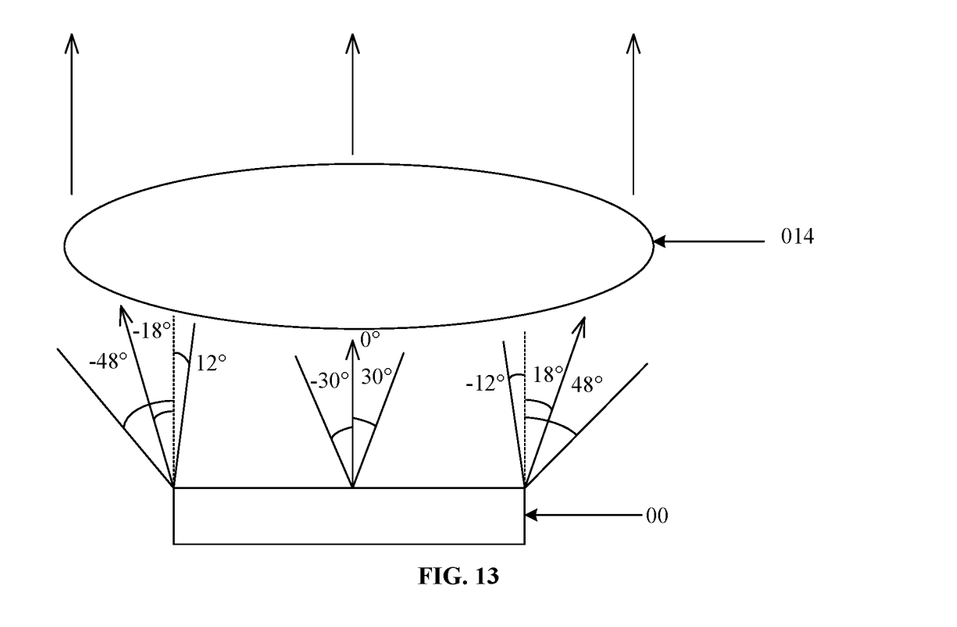
FIG. 13 is a schematic structural diagram of a display device and a collimator according to an embodiment of the present disclosure.

In an exemplary embodiment, referring to FIG. 13, assuming that an angle defined by target sub-pixels in an edge region B on a left side of a display panel 10 and the reference plane C is −18°, the angle range of the light emitted by the target sub-pixels, which can be effectively used by an optical waveguide 013, is −48° to −12°. Assuming that an angle defined by target sub-pixels in an edge region B on a right side of the display panel 10 and the reference plane C is 18°, the angle range of the light emitted by the target sub-pixels, which may be effectively used by the optical waveguide 013, is −12° to 48°.

In some embodiments of the present disclosure, the display apparatus may be virtual reality (VR) device or augmented reality device. The display panel 10 may be a silicon-based OLED display panel, and transistors in the silicon-based OLED display panel are transistors prepared using single crystal silicon. Silicon-based OLED display panels are widely used in VR device and AR device due to their ultra-high pixels per inch (PPI).

Described above are merely the exemplary embodiments of the present disclosure and are not intended to limit the present disclosure. Any modifications, equivalent substitutions, improvements and the like may be made within the scope of protection of the present disclosure, without departing from the spirit and principle of the present disclosure.

What is claimed is:

1. A display panel, comprising:
   a base substrate;
   a plurality of sub-pixels, disposed on a side of the base substrate;
   a color film layer, disposed on a side, distal from the base substrate, of the plurality of sub-pixels and comprising a plurality of color resist sections in one-to-one correspondence to the plurality of sub-pixels, wherein each of the color resist sections comprises a transmission region configured to transmit light and a black matrix region configured to block light, an orthographic projection of the transmission region of the each of the color resist sections on the base substrate being overlapped with an orthographic projection of a sub-pixel corresponding to the color resist section on the base substrate; and
   a plurality of micro-lens structures in one-to-one correspondence to the plurality of sub-pixels, wherein the plurality of micro-lens structures are disposed on a side, distal from the base substrate, of the color film layer, and each of the micro-lens structures is configured to transmit light emitted by a sub-pixel corresponding to the micro-lens structure;
   wherein an axis of the micro-lens structure corresponding to each of the sub-pixels, an axis of the transmission region of the color resist section corresponding to the sub-pixel, and an axis of the sub-pixel are not overlapped with one another, and the axis of the micro-lens structure and the axis of the transmission region of the color resist section are disposed on a same side of the axis of the sub-pixel; and
   the axis of each of the sub-pixels, the axis of the micro-lens structure corresponding to the sub-pixel and the axis of the transmission region of the color resist section corresponding to the sub-pixel are arranged in a pixel row direction.

2. The display panel according to claim 1, wherein the axis of the micro-lens structure corresponding to each of the sub-pixels is disposed on a side, distal from the axis of the sub-pixel, of the axis of the transmission region of the color resist section corresponding to the sub-pixel.

3. The display panel according to claim 2, wherein a first distance between the axis of each of the sub-pixels and the axis of the micro-lens structure corresponding to the sub-pixel is twice a second distance between the axis of the sub-pixel and the axis of the transmission region of the color resist section corresponding to the sub-pixel.

4. The display panel according to claim 2, wherein a distance between a first boundary line of the transmission region of the color resist section corresponding to each of the sub-pixels and a first boundary line of the micro-lens structure corresponding to the sub-pixel is equal to the first distance;
   a second boundary line of the transmission region of the color resist section corresponding to each of the sub-pixels and a second boundary line of the micro-lens structure corresponding to the sub-pixel are collinear; and
   the first boundary line of the transmission region of the color resist section and the first boundary line of the micro-lens structure are disposed on one side of the axis of the sub-pixel, and the second boundary line of the transmission region of the color resist section and the second boundary line of the micro-lens structure are disposed on the other side of the axis of the sub-pixel.

5. The display panel according to claim 1, further comprising:
   a filling layer, disposed on a side, distal from the base substrate, of the plurality of micro-lens structures;
   wherein among the plurality of sub-pixels, a second included angle $\theta 2$ defined by a reference plane and a direction of the light emitted by a target sub-pixel within an edge region of the display panel to a side, distal from the base substrate, of the filling layer satisfies $\theta 2=[\arcsin(n1/n2)] \times \sin \theta 1$,
   wherein the reference plane is perpendicular to a bearing surface of the base substrate and a pixel row direction, an extension direction of the edge region of the display panel is perpendicular to the pixel row direction, $\theta 1$ represents a first included angle defined by a direction of the light emitted from the edge region and the reference plane, n1 represents the refractive index of a medium on the side, distal from the base substrate, of the filling layer, and n2 represents the refractive index of the filling layer.

6. The display panel according to claim 5, wherein a length of each of the micro-lens structures in the pixel row direction is greater than that of each of the sub-pixels in the pixel row direction; and
   a distance x between a side, distal from the axis of the base substrate, of the target sub-pixel and a side, distal from the axis of the base substrate, of the micro-lens structure corresponding to the target sub-pixel satisfies:

$x = H \times \tan \theta 2$, wherein H represents a distance between the plurality of sub-pixels and the plurality of micro-lens structures in a direction perpendicular to the bearing surface of the base substrate, and the axis is perpendicular to the pixel row direction.

7. The display panel according to claim 6, wherein a number N of the sub-pixels in the pixel row direction is an even number; and a length w1 of each of the micro-lens structures in the pixel row direction satisfies:

$$w1 = w2 + \frac{x}{N/2},$$

wherein w2 represents a length of each sub-pixel in the pixel row direction.

8. The display panel according to claim 6, wherein a number N of the sub-pixels in the pixel row direction is an even number; and a first distance h1 between an axis of the y1th micro-lens structure in a direction away from the axis of the base substrate and the axis of the corresponding sub-pixel satisfies:

$$h1 = \frac{x}{N/2} \times y1 - \frac{x}{N},$$

wherein y1 represents a positive integer greater than or equal to 1 and less than or equal to N/2.

9. The display panel according to claim 8, wherein a first distance h2 between an axis of the y1th color resist section in the direction away from the axis of the base substrate and the axis of the corresponding sub-pixel satisfies:

$$h2 = \frac{x}{N} \times y1 - \frac{x}{2N}.$$

10. The display panel according to claim 6, wherein a length L1 in the pixel row direction of the transmission region of the y2th color resist section in a direction away from the axis of the base substrate satisfies:

$$L1 = m1 - \frac{x}{N/2} \times (y2 - 1),$$

wherein y2 represents a positive integer greater than or equal to 2 and less than or equal to N/2; and a distance L2 between the transmission region of the y2th color resist section and the transmission region of the y(2−1)th color resist section in the pixel row direction satisfies:

$$L2 = m2 + \frac{x}{N/2}(y2 - 1),$$

wherein m1 represents a length of the transmission region of each of two color resist sections, most proximal to the axis of the base substrate, in the color film layer in the pixel row direction, and m2 represents a distance between the transmission regions of the two color resist sections, most proximal to the axis of the base substrate, in the color film layer in the pixel row direction.

11. A display device, comprising: a drive circuit, and a display panel, wherein the display panel comprises:
　a base substrate;
　a plurality of sub-pixels, disposed on a side of the base substrate;
　a color film layer, disposed on a side, distal from the base substrate, of the plurality of sub-pixels and comprising a plurality of color resist sections in one-to-one correspondence to the plurality of sub-pixels, wherein each of the color resist sections comprises a transmission region configured to transmit light and a black matrix region configured to block light, an orthographic projection of the transmission region of the each of the color resist sections on the base substrate being overlapped with an orthographic projection of a sub-pixel corresponding to the color resist section on the base substrate; and
　a plurality of micro-lens structures in one-to-one correspondence to the plurality of sub-pixels, wherein the plurality of micro-lens structures are disposed on a side, distal from the base substrate, of the color film layer, and each of the micro-lens structures is configured to transmit light emitted by a sub-pixel corresponding to the micro-lens structure;
　wherein an axis of the micro-lens structure corresponding to each of the sub-pixels, an axis of the transmission region of the color resist section corresponding to the sub-pixel, and an axis of the sub-pixel are not overlapped with one another, and the axis of the micro-lens structure and the axis of the transmission region of the color resist section are disposed on a same side of the axis of the sub-pixel; and
　the axis of each of the sub-pixels, the axis of the micro-lens structure corresponding to the sub-pixel and the axis of the transmission region of the color resist section corresponding to the sub-pixel are arranged in a pixel row direction;
and the drive circuit is connected to the plurality of sub-pixels in the display panel and configured to supply a drive signal to each of the sub-pixels.

12. The display device according to claim 11, wherein the axis of the micro-lens structure corresponding to each of the sub-pixels is disposed on a side, distal from the axis of the sub-pixel, of the axis of the transmission region of the color resist section corresponding to the sub-pixel.

13. The display device according to claim 12, wherein a first distance between the axis of each of the sub-pixels and the axis of the micro-lens structure corresponding to the sub-pixel is twice a second distance between the axis of the sub-pixel and the axis of the transmission region of the color resist section corresponding to the sub-pixel.

14. The display device according to claim 12, wherein a distance between a first boundary line of the transmission region of the color resist section corresponding to each of the sub-pixels and a first boundary line of the micro-lens structure corresponding to the sub-pixel is equal to the first distance;

a second boundary line of the transmission region of the color resist section corresponding to each of the sub-pixels and a second boundary line of the micro-lens structure corresponding to the sub-pixel are collinear; and the first boundary line of the transmission region of the color resist section and the first boundary line of the micro-lens structure are disposed on one side of the axis of the sub-pixel, and the second boundary line of the transmission region of the color resist section and the second boundary line of the micro-lens structure are disposed on the other side of the axis of the sub-pixel.

15. A display apparatus, comprising: a light transmission system, and a display device comprising: a drive circuit, and a display panel, wherein the display panel comprises:
　a base substrate;
　a plurality of sub-pixels, disposed on a side of the base substrate;
　a color film layer, disposed on a side, distal from the base substrate, of the plurality of sub-pixels and comprising a plurality of color resist sections in one-to-one correspondence to the plurality of sub-pixels, wherein each of the color resist sections comprises a transmission region configured to transmit light and a black matrix region configured to block light, an orthographic projection of the transmission region of the each of the color resist sections on the base substrate being overlapped with an orthographic projection of a sub-pixel corresponding to the color resist section on the base substrate; and
　a plurality of micro-lens structures in one-to-one correspondence to the plurality of sub-pixels, wherein the plurality of micro-lens structures are disposed on a side, distal from the base substrate, of the color film layer, and each of the micro-lens structures is configured to transmit light emitted by a sub-pixel corresponding to the micro-lens structure;
　wherein an axis of the micro-lens structure corresponding to each of the sub-pixels, an axis of the transmission region of the color resist section corresponding to the sub-pixel, and an axis of the sub-pixel are not overlapped with one another, and the axis of the micro-lens structure and the axis of the transmission region of the color resist section are disposed on a same side of the axis of the sub-pixel; and the axis of each of the sub-pixels, the axis of the micro-lens structure corresponding to the sub-pixel and the axis of the transmission region of the color resist section corresponding to the sub-pixel are arranged in a pixel row direction:

and the drive circuit is connected to the plurality of sub-pixels in the display panel and configured to supply a drive signal to each of the sub-pixels;

and the light transmission system is disposed on a light exit side of the display device and configured to transmit light emitted by the display device.

16. The display apparatus according to claim 15, wherein the light transmission system comprises: an input grating, an output grating and an optical waveguide; wherein the input grating is disposed on a light exit side of the display device and at an input end of the optical waveguide, and configured to couple light emitted by the display device to the optical waveguide; and the output grating is disposed on a light exit side of the optical waveguide and configured to emit the light transmitted in the optical waveguide into an imaging space for imaging.

17. The display apparatus according to claim 16, wherein the light transmission system further comprises: a collimator;

wherein the collimator is disposed between the light exit side of the display device and the input grating, and configure to collimate the light emitted by the display device and transmit the light into the input grating.

18. The display apparatus according to claim 15, wherein the display apparatus is a virtual reality device or an augmented reality device.

* * * * *